United States Patent [19]

Becker et al.

[11] 4,448,912

[45] May 15, 1984

[54] HEAT HARDENABLE BINDERS COMPRISING AQUEOUS DISPERSIONS OF SOLID EPOXY RESINS, PROCESSES FOR THE PREPARATION THEREOF AND THE USE THEREOF

[75] Inventors: Wilhelm Becker, Hamburg; Albrecht Manz, Wiesbaden, both of Fed. Rep. of Germany

[73] Assignee: Hoechst Aktiengesellschaft, Fed. Rep. of Germany

[21] Appl. No.: 349,840

[22] Filed: Feb. 18, 1982

[30] Foreign Application Priority Data

Feb. 21, 1981 [DE] Fed. Rep. of Germany ....... 3106529
Aug. 20, 1981 [DE] Fed. Rep. of Germany ....... 3132884

[51] Int. Cl.³ ............................................. C08L 63/02
[52] U.S. Cl. ..................................... 523/414; 428/35; 428/418; 523/404; 525/533
[58] Field of Search ......................... 523/414, 404, 426; 525/533; 528/112; 524/901; 428/35, 418; 427/386

[56] References Cited

U.S. PATENT DOCUMENTS

| | | | |
|---|---|---|---|
| 3,269,975 | 8/1966 | Lee ....................................... | 525/533 |
| 3,336,253 | 8/1967 | Wong et al. ......................... | 523/414 |
| 3,989,679 | 11/1976 | Sluis et al. ........................... | 525/533 |
| 4,302,373 | 11/1981 | Steinmetz ............................ | 525/533 |

*Primary Examiner*—Theodore E. Pertilla
*Attorney, Agent, or Firm*—Muserlian, Bierman, Bierman & Peroff

[57] ABSTRACT

Heat hardenable binders comprising aqueous dispersions of solid epoxy resins of a special structure, wherein some of the glycidyl groups are converted into quaternary ammonium groups by means of primary and/or secondary amines and quaternization, and further containing hardeners and possibly other conventional additives, characterized in that they contain, as hardeners, polybasic water-soluble polycarboxylic acid units or the anhydrides or acid esters thereof having a COOH functionality of at least 3, and the use of the binders for the preparation of hardened products, particularly coatings.

14 Claims, No Drawings

HEAT HARDENABLE BINDERS COMPRISING AQUEOUS DISPERSIONS OF SOLID EPOXY RESINS, PROCESSES FOR THE PREPARATION THEREOF AND THE USE THEREOF

This invention relates to heat hardenable binders comprising aqueous dispersions of epoxy resins.

In the field of resin lacquers and coating compositions, polyglycidyl ethers have particularly proved to be of value on account of their excellent technical properties. With the use of higher molecular weight polyglycidyl ethers with softening points of between 40° and 130° C. and epoxy equivalents of between 300 and 3000, new fields of application have been opened up, particularly in the production of coatings. The epoxy resins which are used for coating compositions either in the form of powders or as solutions in organic solvents may be cross-linked in known manner with carboxylic anhydrides or with dicyanodiamide, whereby it is predominantly the epoxy groups of the polyglycidyl ether which react. However, cross-linking to form hardened coatings may also be effected in the presence of heat, using melamine resins or resols, which may optionally be etherified and which are present in an amount of from 10 to 60% by weight, preferably 20 to 40% by weight in the mixture, whereby it is predominantly the OH groups present in the higher-molecular weight polyglycidyl ether which react. Systems of this kind are used particularly for coating containers.

One disadvantage of powder coating is the poor flow. Even when known flow adjuvants are added, the flow cannot be improved to an extent sufficient that the surface quality of the film produced comes up to that obtained with coating films produced with solvent-based systems. The relatively high capital costs for powder production and powder coating plant are another disadvantage.

For this reason, coating by solvent-based systems continues to be essential for a number of fields of application. However, the disadvantages of the substantial pollution caused by the evaporation of solvents are becoming increasingly important and the construction of expensive afterburning plants which is usually necessary and the loss of solvent are critical factors in an analysis of the energy and costs involved. In many cases, the use of solvent-based systems is totally out of the question for health reasons.

U.S. Pat. No. 3,336,253 discloses resins in the form of reaction products of mono- or dialkanolamines and various water-insoluble polymers, particularly polyglycidyl ethers with amine-reactive end groups. These products are made water-soluble by neutralisation of the alkanolamine group with an acid. The preferred reaction products contain one epoxy group per molecule. They may be applied as coatings to various substrates and then cross-linked by self-polymerisation. One disadvantage of these coating compositions is the presence of epoxy groups which may undergo self-polymerisation in the presence of traces of acidic or basic substances, e.g. the alkanolamine groups present in the end position in each molecule, resulting in the formation of cross-linked non-fusible products. This greatly reduces the shelf life of the products. In this same publication, it says that the shelf life of the polyglycidyl ether/alkanolamine reaction products may be improved by eliminating all unreacted epoxy groups, e.g. by means of dialkanolamines. This procedure is undesirable, since it eliminates all the reactive points needed for the subsequent cross-linking operation, required for the preparation of a permanent, solvent-resistant coating. Moreover, these products can only be prepared by using very large quantities of dialkanolamine, e.g. up to 28% of diethanolamine. The coatings obtained are so unstable in the presence of aqueous media that they are totally unusable for many applications.

The water-dilutable reaction products of polyepoxides and mono- and/or dialkanolamines prepared according to German Offenlegungsschrift No. 2 415 100 are derived from stoichiometric quantities of alkanolamines, based on epoxy resin. Examples of suitable amines mentioned are diethanolamine and dipropanolamine. The amines added to the epoxy resin are quaternised with monocarboxylic acids, the $pK_a$ values (=negative logarithm to the base 10 of the dissociation constant) of which is 2 to 5, including polyhydroxymonocarboxylic acids with at least three OH groups per molecule, to form quaternary ammonium groups of structure (II)

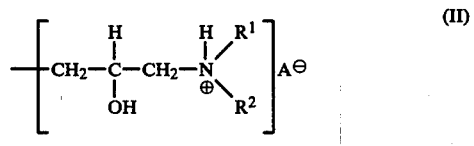

wherein $A^\ominus$ represents an anionic group of a monocarboxylic acid, $R^1$ and $R^2$ represent hydroxyalkyl groups with 2 or 3 carbon atoms, particularly hydroxyethyl or β-hydroxypropyl groups, but one of the groups may also be hydrogen.

These aqueous systems, which may possibly be used in solvent-free dispersions, contain reaction products of formaldehyde and phenol, urea or melamine as latent hardeners. The films produced therefrom are resistant to the conditions under which sterilisation of food preserve is effected. However, it is desirable to produce phenol-free systems.

According to the process described in German Offenlegungsschrift No. 2 426 996, the quantities of amine were reduced to about 5%, but the dispersions still contain substantial quantities of solvent. This process is also not suitable for the production of solvent-free dispersions, which means that again it may cause environmental pollution.

The present invention avoids the disadvantages mentioned above. According to the invention, there is provided a heat-hardenable binder composition comprising an aqueous dispersion of a solid epoxy resin of formula

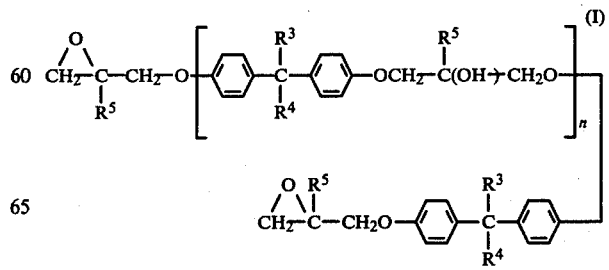

wherein $R^3$, $R^4$ and $R^5$, which may be the same or different, each represents methyl or hydrogen, and n represents an integer from 2 to 20, and the glycidyl groups being partly converted, by means of primary and/or secondary amines and quaternisation, into quaternary ammonium groups of formula

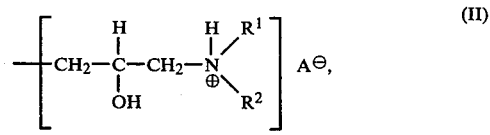

wherein $A^\ominus$ represents an anionic group of a monocarboxylic acid with 1 to 6 carbon atoms $R^1$ and $R^2$, which may be the same or different, each represents hydrogen, alkyl having 1 to 6, preferably 1 to 4 carbon atoms, or hydroxyalkyl having 1 to 6, preferably 2 to 4 carbon atoms, and particularly hydroxyethyl or β-hydroxypropyl, except that at least one of $R^1$ and $R^2$ represents hydroxyalkyl, the composition additionally containing at least one hardener and optionally other conventional additives, which are characterised in that they contain, as a hardener, a polybasic water-soluble polycarboxylic acid unit or the anhydrides or acid esters thereof with a COOH functionality of at least three, and generally 0 to 30, preferably 0 to 20% by weight of an organic solvent.

The binders according to the invention are distinguished primarily by their very good elasticity after hardening. In addition, they are non-pollutant.

Examples of solid epoxy resins which may be used are those based on diphenylolpropane and/or -methane and epihalohydrin and/or methyl epihalohydrin, preferably epichlorohydrin, which may be prepared by the one- or two-step processes described in the literature (see for example "Epoxydverbindungen und Epoxydharze", Paquin (1958), pages 322 ff.). The epoxy resins conveniently have epoxy equivalents of from 300 to 3000, preferably from 1000 to 2500, and softening points (according to Durrans) of from 40 to 145, preferably 100° to 130° C.

Examples of amines for addition to the glycidyl groups include mono- and/or dialkanolamines of formula

wherein $R^1$ and $R^2$ are as hereinbefore defined. These include, for example, diethanolamine, dipropanolamine, and the isomers of homologues thereof.

Advantageously, at least 5 and not more than 90, preferably from 40 to 80% of the glycidyl groups present in the free epoxy resin are reacted by addition with the amines.

Examples of acids for the quaternisation of the amines added to the epoxy resin, i.e. forming the quaternary group (II), include monocarboxylic acids with 1 to 6, preferably 2 to 6 carbon atoms, which are unsubstituted or substituted with an OH group, such as formic, acetic, glycolic, lactic or dimethylolpropionic acid, or polyhydroxymonocarboxylic acids with at least three OH groups per molecule, and with a $pK_a$ value of from 2 to 5, e.g. trioxybutanecarboxylic acids, such as α,β,γ-trioxy-n-valeric acid, 2-desoxy-l-ribonic acid (=l-erythro-β,γ,δ-trioxy-n-valeric acid), 2-desoxy-l-rhamnonic acid (=l-arabo -β,γ,δ-trioxy-n-caproic acid), digitoxonic acid (=d-ribo-β,γ,δ-trioxy-n-caproic acid), and the tetraoxybutanecarboxylic acids such as d- and l-ribonic acid d- and l-arabonic acid, d- and l-xylonic acid, and methylpentonic acids such as d-glucomethyl acid, d-glucomethylonic acid, d- and l-rhamnonic acid, l-fuconic acid, 2-desoxy-d-gluconic acid, 1,2,4,5-tetraoxypentane-carboxylic acid-(2) (=maltosaccharinic acid), and the n-hexonic acids such as d-allonic acid, d-altronic acid, d-gluconic acid, d-talonic acid, d- and l-mannonic acid, d-idonic acid, d- and d, l-galactonic acid. Gluconic acid and lactic acid are preferred. Surprisingly, the use of these acids leads to a substantial increase in the dispersing effect with equivalent quantities of the cationic groups.

Examples of hardeners include, for example, cyclobutanetetracarboxylic acid, cyclopentanetetracarboxylic acid, 1,2,3,4-butanetetracarboxylic acid, aconitic acid, citric acid and anhydrides of these acids, where they exist, or acid esters, which always have at least three free COOH groups, from these acids and polyhydric alcohols with 2 to 12, preferably 2 to 6 carbon atoms, such as glycerol, trimethylolethane or -propane, alkanediols and the oligomers thereof which may optionally contain one or more ether bridges, such as ethylene glycol, propane- and butanediols, diethylene and dipropylene glycol, triethylene glycol, neopentyl glycol or the like. Examples of esters of this kind include those obtained from 2 mol of citric acid and 1 mol of ethylene glycol.

It is also possible to use acid esters with three or more COOH groups of pyromellitic acid, trimellitic acid, phthalic acid, endomethylenetetra- or -hexahydrophthalic acid, maleic acid, fumaric acid or the anhydrides thereof, if they exist, with polyhydric alcohols, e.g. those listed hereinbefore, as the polycarboxylic acid hardener, if these acid esters are sufficiently water-soluble or dilutable in water. Care must be taken to ensure that dibasic carboxylic acids are reacted with at least trihydric alcohols or dihydric alcohols are reacted with at least tribasic carboxylic acids, in order to obtain a sufficient number of COOH groups in the acid ester.

The addition of the primary and/or secondary amine to the glycidyl groups and the quaternisation of the adduct formed with a monocarboxylic acid is preferably effected in the presence of at least one organic solvent with a boiling point of between 40° and 170° C., preferably an alkanol, e.g. those listed hereinafter, at temperatures at which the solvent does not react with the epoxide groups. Examples of solvents include those which may be eliminated, after dispersion has occurred, by distillation under reduced pressure. If the solvent is not eliminated, it may be a higher boiling solvent.

The solvents in which the solid epoxy resins are present in dissolved form at 50° to 100° C., before the addition of amine, and which may be contained in the aqueous dispersion, may be, depending on the type of epoxy resin, any low boiling point alcohol, such as methanol, ethanol, the various propanols and butanols, aromatic hydrocarbons, such as benzene, toluene or xylene, and also the various lower boiling point ketones, e.g. acetone, methyl ethyl ketone and methyl isobutyl ketone, optionally in admixture with alkanols. It is also possible to use ethers such as tetrahydrofuran, monoalkyl ethers of ethylene glycol, such as methylglycol, ethylglycol, butylglycol, hexylglycol or the corresponding diethers of ethylene glycol, esters such as ethyl acetate, n-butyl acetate and halogenated aromatic compounds, e.g. chlorobenzene. Preferably, solvents with a boiling point of below 145° C. and particular mixtures of alcohols, e.g. those mentioned hereinbefore, and up to 90% of aromatic compounds, e.g. toluene, or xylene, are used.

Before the modified epoxy resins are dispersed, it is also possible to add non-ionic emulsifiers, such as acyl, alkyl, oleyl and alkylaryl ethoxylates, polyoxyethylene sorbitol monoacylates, copolymers of ethylene oxide and propylene oxide containing not less than 10% of ethylene oxide, and also the alkynediol of formula

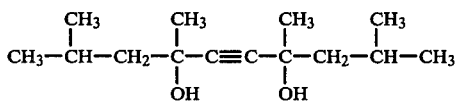

or ethoxylation products thereof, the eulsifiers used preferably being those with an HLB value (hydrophilic lipophilic balance) of more than 10, in order to ensure that the product is adequately dilutable in water.

The preparation of the binders according to the invention from aqueous dispersions of solid epoxy resins is conveniently effected by mixing the solid epoxy resin, which is dissolved in an organic solvent or mixture of solvents, with the primary or secondary amine, by intimately mixing the components, e.g. by stirring, at 40° to 100° C., preferably at 60° to 90° C. over from 10 to 180, preferably from 15 to 60 minutes, and at the end of a condensation period which may be, for example, 10 to 300, preferably 60 to 240 minutes, the monocarboxylic acid is added within the same temperature range, the ratio of equivalents of monocarboxylic acid to amine being (0.5 to 3):1, preferably (0.7 to 1.4):1. The monocarboxylic acid is generally added over a period of 10 to 80, preferably 40 to 80 minutes.

The non-ionic emulsifier is then added in a quantity of, generally, 0.1 to 10% by weight, preferably 0.5 to 5% by weight, based on the solid epoxy resin used. Using a sufficient quantity of deionised water, which generally corresponds to 50 to 200, preferably 80 to 120% by weight of the solid epoxy resin used, the aqueous dispersion is produced, conveniently at 20° to 80° C., preferably at 30° to 60° C.; the solvent may subsequently be eliminated azeotropically from this dispersion under reduced pressure at, for example, 15 to 300 mm Hg and at 20° to 40° C. The mixture is then concentrated to give a solids content of from 50 to 60% by weight, or else only enough deionised water is added to give the desired solids content.

The aqueous epoxy resin dispersion is then mixed with, for example, 2 to 20% by weight of the hardener, based on the solids content of the aqueous epoxy resin dispersion and the components are homogeneously mixed.

In addition, small amounts, e.g. up to 3% of the solids content, of hardening accelerators such as phosphoric acid and p-toluenesulphonic acid or the morpholine salts thereof and flow agents such as water-compatible silicone oils based on a siloxane glycol copolymer may be added to the heat-hardenable binder according to the invention.

The heat-hardenable binders prepared from aqueous dispersions and water-soluble hardeners may be stoved at temperatures of, generally, from 120° to 350° C., preferably 150° to 220° C.

The binders according to the invention may be used in a variety of ways, particularly for the preparation of paints and coatings. The hardened products have excellent resistance to water, acids and chemicals, together with good surface gloss and very good elasticity. Thanks to their great elasticity, films prepared from the binders and applied to metal, for example, may be deformed or shaped with the substrate, e.g. the sheet metal, without being damaged. In particular, they may readily be subjected to deep drawing. Since the products are also resistant to the conditions under which sterilisation of food preserve is effected, hereinafter referred to as "sterilisation resistant", and do not give off any substances which affect flavour, they are especially suitable for coating food packages, particularly food cans.

The invention is illustrated by the following Examples, in which % represents percent by weight. The viscosities were determined in each case at 25° C. using a Brookfield viscosimeter.

EXAMPLES (I) Preparation of the dispersions (1) 364 g of solid epoxy resin based on bisphenol A (epoxy equivalent 410) were melted and dissolved in 180 g of n-butanol at 105° C. At 80° C., 21 g of diethanolamine were added over a period of 15 minutes (22.5% of the glycidyl groups were reacted). The mixture was left to react for 1 hour at 80° C. and then 99 g of 50% gluconic acid were added at 70° C. over a period of 1 hour. The ratio of acid to amine was 1.23; particle size 0.6 μm.

(2) 364 g of solid epoxy resin based on bisphenol A (epxoy equivalent 910) were melted and dissolved at 125° C. in 45 g of toluene and 135 g of n-butanol. At 80° C., 4 g of diethanolamine were added over 15 minutes (9.1% of the glycidyl groups were reacted). The mixture was left to react for 1 hour at 80° C. and then 11 g of 50% gluconic acid were added over 1 hour at 70° C. The ratio of acid to amine was 0.74; particle size 0.55 μm.

(3) 364 g of solid epoxy resin based on bisphenol A (epoxy equivalent 1865) were melted and dissolved at 125° C. in 45 g of toluene and 135 g of n-butanol. At 80° C., 4 g of diethanolamine were added over a period of 15 minutes (18.7% of the glycidyl groups were reacted). The mixture was left to react for 1 hour at 80° C. and then 11 g of 50% gluconic acid were added at 70° C. over 1 hour. The ratio of acid to amine was 0.74; particle size 0.5 μm.

Aqueous dispersions were prepared from these preliminary stages by stirring in 450 to 1000 g of deionised water at 30° to 80° C., preferably 40° to 50° C., until an oil/water emulsion was formed from which the mixture of solvents was eliminated azeotropically with water, under reduced pressure, at about 40° C. The dispersions were concentrated to give a solids content of from 55 to 60% and then filtered through a 56 μm screen.

|  | Example 1 | Example 2 | Example 3 |
|---|---|---|---|
| Solids content, % | 56.4 | 63.3 | 61.7 |
| Viscosity, mPa.s (25° C.) spindle 3/30 rpm (Brookfield) | 5330 | 1160 | 1000 |

-continued

|  | Example 1 | Example 2 | Example 3 |
|---|---|---|---|
| pH | 4.1 | 3.7 | 3.7 |

(4) 291 g of the epoxy resin of Example 3 were melted and dissolved at 130° C. in 36 g of toluene and 108 g of n-butanol, over 1 hour. At 80° C., 9 g of diethanolamine were added in 15 minutes (57.5% of the glycidyl groups were reacted). The mixture was left to react for 1 hour at 80° C. Then 7.2 g of 99% formic acid were added over 1 hour. The ratio of acid to amine was 1.8.

The reaction product was cooled to 40° C. and 500 g of deionised water were added over 1 hour. Then the mixture of solvents was eliminated by azeotropic distillation with water under reduced pressure at 40° C. The dispersion was filtered through a 56 μm screen. Solids content 44.5%, viscosity 1700 mPa.s (spindle 3/30 rpm), particle size 0.4 μm.

(5) Example 4 was repeated, except that only 300 g of deionised water were used to prepare the aqueous dispersion. No distillation was carried out. Solids content 41%, viscosity 1900 mPa.s (spindle 3/30 rpm), particle size 0.4 μm, solvent content about 19%.

(6) The process was repeated as described in Example 4 except that 23.9 g of 90% lactic acid were used instead of formic acid. The ratio of acid to amine was 2.79. In addition, 500 g of deionised water were used. Solids content 42.5%, viscosity 1800 mPa.s (spindle 3/30 rpm), pH value 3.25, particle size 0.5 μm.

(7) 500 g of solid epoxy resin as in Example 3 were melted and dissolved at 130° C. in 62 g of toluene and 185 g of n-butanol. At 80° C., 6.4 g of diethanolamine were added over a period of 15 minutes (22.9% of the glycidyl groups present were reacted). The mixture was left to condense for 1 hour at 80° C., then at 70° C., 86 g of deionised water were added and then, over a period of 1 hour, 21.7 g of 50% gluconic acid were added. The ratio of acid to amine was 0.91.

At 40° C., 690 g of deionised water were added over about 1 hour. After the addition of 5 g of 2,4,7,9-tetramethyl-5-decyne-4,7-diol, about 600 g of distillate were eliminated under reduced pressure at 40° C. After the addition of 5.5 g of a flow agent, e.g. a siloxane glycol copolymer compatible with water, the dispersion was filtered through a 56 μm screen. Solids content 58%, viscosity 450 mPa.s (spindle 2/12 rpm), pH value 3.3 and particle size 0.3 to 0.5 μm.

(8) Example 7 was repeated, except that only 400 g of deionised water were used for the preparation of the aqueous dispersion. No distillation was carried out. Solids content 40%, viscosity 550 mPa.s (spindle 2/12 rpm), pH 3.5 and particle size 0.3 to 0.5 μm; solvent content about 16%.

(9) 500 g of the epoxy resin of Example 3 were dissolved in a mixture of 187 g of butanone and 62 g of n-butanol by refluxing at a maximum temperature of 80° C. At 70° C., 5.8 g of diethanolamine and then 86 g of deionised water were added, over a period of 20 minutes (20.7% of the glycidyl groups present were reacted). The mixture was condensed for about 3 hours at 70° C. and 19.5 g of 50% gluconic acid were added at the same temperature over a period of 20 minutes. The ratio of acid to amine was 0.9. At the same temperature, 5 g of a non-ionic emulsifier (polyoxyethylene glycol ester of an unsaturated $C_{18}$ fatty acid, the polyoxyethylene group of which contains 50 ethylene oxide units), dissolved in 10 g of deionised water, were added.

At 40° C., a dispersion was prepared using 540 g of deionised water. The dispersion was concentrated under reduced pressure at about 40° C. to give a solids content of 57 to 58%, the mixture of solvents being eliminated azeotropically. In the distillation process, a suitable antifoam agent may be added, both here and in the other examples. After the addition of 5.5 g of a flow agent as in Example 7, the dispersion was filtered through a 56 μm screen. Viscosity at 58% solids content: 120 mPa.s (spindle 2/12 rpm), particle size 0.32 μm.

(10) Example 9 was repeated, except that only 340 g of deionised water were used for the preparation of the aqueous dispersion. No distillation was effected. Viscosity at 43% solids content: 160 mPa.s (spindle 2/12 rpm), particle size 0.35 μm, solvent content about 20%.

(II) Preparation of the binders (Invention)

The heat hardenable binders according to the invention were prepared from the aqueous dispersions of Examples 3 to 6 as follows:

(11) The dispersions were homogeneously mixed with 3.5% of 1,2,3,4-butanetetracarboxylic acid (20% solution in deionised water) and 0.6% phosphoric acid (8.5% solution in deionised water), these percentages being based on the solids content of the aqueous solid epoxy resin dispersion.

Using a triangular spreader, films about 30 μm thick were applied to electrolytically tin-plated sheet steel. After a drying time of 10 minutes, the films were stoved at 200° C. for 10 minutes. Glossy, transparent, elastic films were obtained, which were readily sterilisation resistant and showed good resistance to organic acids.

(12) and (13) Instead of the butanetetracarboxylic acid, 7% and 9% respectively, of citric acid (20% solution in deionised water) and 0.6% of phosphoric acid (8.5% solution in deionised water) were homogeneously mixed, these percentages being based on the solids content of the aqueous dispersion of the solid epoxy resin. The films prepared in the same way showed equally good properties.

(14) The same procedure was used as in Example 11. Instead of the butanetetracarboxylic acid, 11.5% of an acidic partial ester from 1 mol of citric acid and 0.55 mol. of neopentylglycol, esterified in the presence of 0.04% of dibutyl tin oxide at 145° C. until the acid number was 465, were used. The stoved films had the same good properties.

If, instead of dispersions 3 to 6, dispersions 1, 2 and 7 to 10 are used to prepare the binders and further processed as described in Examples 11 to 14, hardened films are again obtained which have good coating properties.

We claim:

1. A heat hardenable binder composition comprising an aqueous dispersion of a resin derived from a solid epoxy resin of the general structure

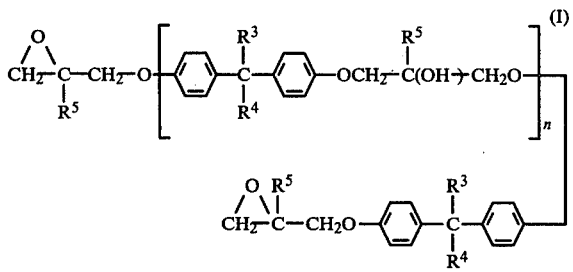

wherein $R^3$, $R^4$ and $R^5$ independently are methyl or hydrogen and n is an integer from 2 to 20 and the glycidyl groups in part are converted to ammonium groups of the structure

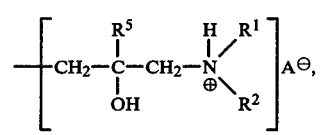

in which $A^\ominus$ represents the anionic group of a monocarboxylic acid having from 1 to 6 carbon atoms and at least one of the radicals $R^1$ and $R^2$ represents hydroxyalkyl having from 1 to 6 carbon atoms and at most one of $R^1$ and $R^2$ is hydrogen and the composition containing in addition an effective amount of a polybasic water-soluble polycarboxylic acid unit containing at least 3 carboxyl functions acting as a hardener and being selected from the group consisting of polycarboxylic acids, anhydrides thereof and acid esters still containing at least three carboxyl functions.

2. A composition as claimed in claim 1 wherein the starting epoxy resin of formula I has an epoxy equivalent from 300 to 3000 and a softening point according to Durrans in the range from 40 to 145.

3. A composition as claimed in claim 1 wherein 5 to 90% of the glycidyl groups contained in the starting epoxy resin of formula I have been converted to ammonium groups of formula II.

4. A composition as claimed in claim 1 wherein the hardener is present in an amount from 2 to 20% by weight referred to the solids content of the dispersion.

5. A composition as claimed in claim 1 which in addition contains a non-ionic emulsifier in an amount from 0.1 to 10% by weight, referred to the solid starting epoxy resin used.

6. A composition as claimed in claim 1 which in addition contains up to 30% of at least one organic solvent.

7. A composition as claimed in claim 1 wherein one of $R^1$ and $R^2$ is alkyl having from 1 to 6 carbon atoms.

8. A process for the manufacture of binder compositions which comprises reacting at a temperature in the range from 40° to 100° C. a solid epoxy resin of the structure (I) dissolved in an organic solvent, with a primary or secondary amine of the formula

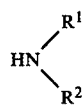

or a combination thereof and subsequently in the same range of temperature with a monocarboxylic acid $H^+A^\ominus$, the ratio of the equivalents of the monocarboxylic acid to the amine being in the range of from (0.5 to 3) to 1, dispersing the reaction product thus obtained in water, removing solvent therefrom and then adding thereto as a hardener an effective amount of at least one polybasic water-soluble polycarboxylic acid unit or acidic esters thereof the COOH-functionality of which being always at least 3, structure (I), groups $R^1$ and $R^2$ and $A^\ominus$ being as defined in claim 1.

9. An article coated by a composition as claimed in claim 1 and subsequently hardened.

10. An article as claimed in claim 9 wherein the hardening has been effected at a temperature in the range from 120° to 350° C.

11. A heat hardenable binder composition comprising an aqueous dispersion of a resin derived from a solid epoxy resin having an epoxy equivalent from 1000 to 2500 and a softening point according to Durrans of from 100 to 130 and having the general structure

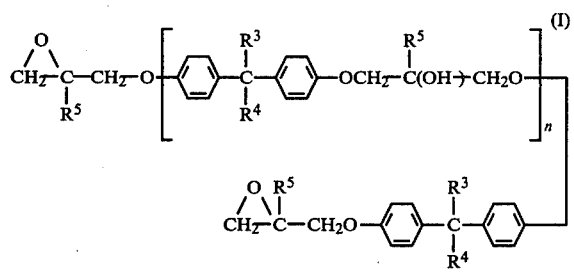

wherein $R^3$, $R^4$ and $R^5$ independently are methyl or hydrogen and n is an integer from 2 to 20 and 40 to 80% of the glycidyl groups are converted to ammonium groups of the structure

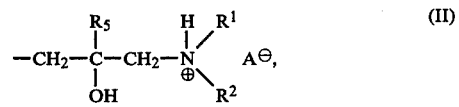

in which $A^\ominus$ represents the anionic group of a monocarboxylic acid having from 1 to 6 carbon atoms and at least one of the radicals $R^1$ and $R^2$ represents hydroxyalkyl having from 1 to 6 carbon atoms and at most one of $R^1$ and $R^2$ is hydrogen and the composition containing in addition as a hardener 2 to 20% by weight, referred to the solids content of the epoxy resin dispersion, of a polybasic water-soluble polycarboxylic acid unit containing at least 3 carboxyl functions and being selected from the group consisting of polycarboxylic acids, anhydrides thereof and acid esters still containing at least three carboxyl functions, and containing also from 0.5 to 5% by weight, referred to the solid epoxy resin used, of a non-ionic emulsifier.

12. A composition as claimed in claim 1, which also contains up to 3% of the solids content of a hardening accelerator.

13. A composition as claimed in claim 12, wherein the hardening accelerator is phosphoric acid, p-toluene sulfonic acid or a morpholine salt thereof.

14. A process as claimed in claim 8, wherein the hardener is added in an amount from 2 to 20% by weight referred to the solids content of the dispersion.

* * * * *